United States Patent
Abe et al.

(10) Patent No.: US 7,934,071 B2
(45) Date of Patent: *Apr. 26, 2011

(54) METHOD OF MANAGING STORAGE CAPACITY IN A STORAGE SYSTEM, A STORAGE DEVICE AND A COMPUTER SYSTEM

(75) Inventors: Shigeru Abe, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/324,531

(22) Filed: Nov. 26, 2008

(65) Prior Publication Data

US 2009/0089499 A1  Apr. 2, 2009

Related U.S. Application Data

(63) Continuation of application No. 10/965,855, filed on Oct. 18, 2004, now Pat. No. 7,475,217.

(30) Foreign Application Priority Data

Aug. 9, 2004 (JP) ................................. 2004-231792

(51) Int. Cl.
G06F 12/00 (2006.01)
G06F 13/00 (2006.01)
G06F 13/28 (2006.01)
(52) U.S. Cl. ........................................ 711/171; 711/156
(58) Field of Classification Search .................. 711/171
See application file for complete search history.

(56) References Cited

U.S. PATENT DOCUMENTS

| 7,216,263 | B2 | 5/2007 | Takaoka et al. | |
|---|---|---|---|---|
| 7,434,011 | B2 * | 10/2008 | Shue | 711/156 |
| 2002/0129216 | A1 | 9/2002 | Collins | |
| 2002/0194326 | A1 * | 12/2002 | Gold et al. | 709/224 |
| 2003/0172146 | A1 * | 9/2003 | Collins | 709/223 |
| 2005/0015475 | A1 | 1/2005 | Fujita et al. | |
| 2005/0086432 | A1 | 4/2005 | Sakai | |
| 2006/0218364 | A1 | 9/2006 | Kitamura | |
| 2007/0055842 | A1 | 3/2007 | Abe et al. | |
| 2007/0294206 | A1 * | 12/2007 | Korman et al. | 707/1 |

FOREIGN PATENT DOCUMENTS

| JP | 2003-50724 | 2/2003 |
|---|---|---|
| JP | 2004-139494 | 5/2004 |

OTHER PUBLICATIONS

Japanese Office Action; Application No. 2004-231792; dated issued: Feb. 19, 2010 (Translation of Official Action issued by Japan Patent Office, relevant part only).

* cited by examiner

*Primary Examiner* — Brian R Peugh
*Assistant Examiner* — Prasith Thammavong
(74) *Attorney, Agent, or Firm* — Antonelli, Terry, Stout & Kraus, LLP.

(57) ABSTRACT

A capacity management method of managing a capacity of a storage unit of each storage in a computer system having a plurality of storage devices each having one or more storage units each providing one or more storage areas. The method includes the steps of: detecting a storage area relation between a first storage area and a second storage area; and calculating an estimated capacity necessary for the storage unit in accordance with a detection result.

7 Claims, 13 Drawing Sheets

| REMOTE COPY ID | ORIGINAL VOLUME | REPLICA VOLUME'S STORAGE DEVICE | REPLICA VOLUME |
|---|---|---|---|
| 1 | V41 | S5 | V52 |

| TOTAL STORAGE CAPACITY | 450GB | ~20710 |
|---|---|---|
| EMPTY STORAGE CAPACITY | 50GB | ~20720 |

| VOLUME ID | VOLUME CAPACITY | DISK TYPE |
|---|---|---|
| V41 | 200GB | FC |
| V42 | 200GB | FC |

| REMOTE COPY ID | ORIGINAL VOLUME'S STORAGE DEVICE | ORIGINAL VOLUME | REPLICA VOLUME'S STORAGE DEVICE | REPLICA VOLUME |
|---|---|---|---|---|
| 1 | S4 | V41 | S5 | V52 |
| 2 | S5 | V53 | S6 | V64 |

| HISTORY ID | STORAGE DEVICE | VOLUME | TIME | USE CAPACITY |
|---|---|---|---|---|
| 1 | S4 | V41 | 2004/1/1 00:00:00 | 175GB |
| 2 | S4 | V41 | 2004/2/1 00:00:00 | 200GB |
| 3 | S4 | V42 | 2004/1/1 00:00:00 | 195GB |
| 4 | S4 | V42 | 2004/2/1 00:00:00 | 200GB |
| 5 | S5 | V53 | 2004/1/1 00:00:00 | 50GB |
| 6 | S5 | V53 | 2004/2/1 00:00:00 | 100GB |
| 10111 | 10112 | 10113 | 10114 | 10115 |

FIG.9

| DISCOVERY ID | DEVICE ID | IP ADDRESS | DEVICE INFORMATION |
|---|---|---|---|
| 1 | S4 | 100.100.100.104 | VENDOR A/PRODUCT A |
| 2 | S5 | 100.100.100.105 | VENDOR A/PRODUCT A |
| 3 | S6 | 100.100.100.106 | VENDOR A/PRODUCT B |
| 10121 | 10122 | 10123 | 10124 |

FIG.12

INCREASE SUBJECT    STORAGE DEVICE S4

INCREASE CAPACITY    190    GB

ESTIMATED RESULTS

| STORAGE DEVICE | INSUFFICIENT CAPACITY | CONTENTS |
|---|---|---|
| S5 | 500GB | 167GB/333GB |
| S6 | 100GB | 100GB |

FIG.13

INCREASE SUBJECT    STORAGE DEVICE S4

GUARANTEE TERM    180    DAYS

ESTIMATED RESULTS

| STORAGE DEVICE | INSUFFICIENT CAPACITY | CONTENTS |
|---|---|---|
| S4 | 130GB | 100GB/30GB |
| S5 | 200GB | 67GB/133GB |
| S6 | 0GB | — |

| STORAGE DEVICE | VOLUME | DISK TYPE |
|---|---|---|
| S4 | V41 | FC |
| S5 | V52 | FC |
| S5 | V53 | ATA |
| S6 | V64 | FC |

INCREASE SUBJECT    STORAGE DEVICE S4

INCREASE CAPACITY    190    GB

52010

ESTIMATED RESULTS    52020

| STORAGE DEVICE | INSUFFICIENT CAPACITY (FC) | INSUFFICIENT CAPACITY (SerialATA) | CONTENTS |
|---|---|---|---|
| S4 | 150GB | 0GB | 150GB(FC) |
| S5 | 167GB | 333GB | 167GB(FC)/333GB(ATA) |
| S6 | 100GB | 0GB | 100GB(FC) |

ESTIMATED RESULTS

| STORAGE DEVICE | REMAINING DAYS |
|---|---|
| S4 | 50 DAYS |
| S5 | 40 DAYS |
| S6 | 180 DAYS |

METHOD OF MANAGING STORAGE CAPACITY IN A STORAGE SYSTEM, A STORAGE DEVICE AND A COMPUTER SYSTEM

INCORPORATION BY REFERENCE

This application is a continuation of U.S. application Ser. No. 10/965,855, filed Oct. 18, 2004 now U.S. Pat. No. 7,475,217 and which application claims priority from Japanese application JP2004-231792 filed on Aug. 9, 2004, the entire contents of which are hereby incorporated by reference into this application.

BACKGROUND OF THE INVENTION

The contents disclosed in this specification relate to a storage capacity of a storage device used by a computer system, and more particularly to a method of managing the storage capacity of a storage system.

Developments of IT technologies and industries have increased the demands for storage systems. A storage system is a system for storing data by interconnecting one or more storage devices on a network. Data is stored one after another in the storage system and improved techniques of managing the storage capacity of storage systems has been a recent concern. For example, JP-A-2003-50724 describes a method of estimating the storage capacity of one storage device to be used, from the history information, and provides a notification of an insufficient storage capacity in advance to a management server.

SUMMARY OF THE INVENTION

One method of improving the reliability of a storage system is remote copying. Remote copying is a technique wherein a copy of data in a volume (storage area) of a storage device is formed in a volume of one or a plurality of storage devices connected to a network to synchronize replica data with the original data.

Figure 1:
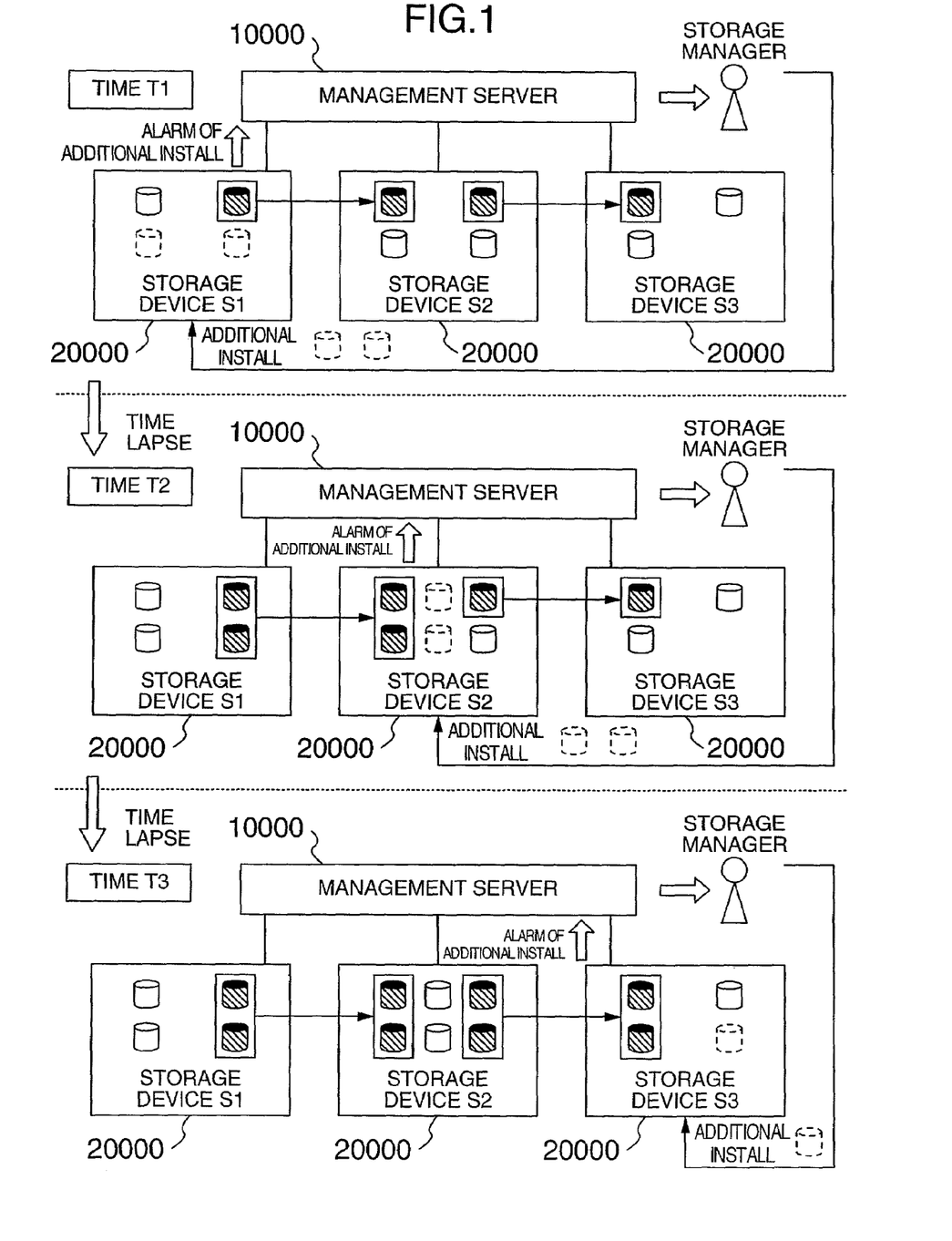
FIG. 1 is a diagram showing a storage system having a remote copy configuration.

With reference to FIG. 1, description will be made on the issue occurring in a storage system when a remote copy configuration associated with a plurality of volumes is incorporated.

FIG. 1 shows the outline of the configuration of a management server 10000 and storage devices 20000 time sequentially. The management server 10000 is connected to the storage devices S1, S2 and S3 via a network, and notifies an alarm issued at each storage device to a manager. A volume of S1 is remote-copied to a volume of S2, and a volume of S2 is remote-copied to a volume of S3. Each storage device stores log data or the like of service operations so that the data amount increases with time and the data amount to be remote-copied also increases.

At time T1, S1 issues an alarm because of an insufficient storage capacity. The management server 10000 notifies the alarm to a storage manager which in turn increases the storage capacity of S1. After the storage capacity is increased, data is stored in volumes as the time lapses. At time T2 when the remote copy capacity between S1 and S2 increases, S2 issues an alarm because of an insufficient storage capacity. The management server 10000 notifies the alarm to a storage manager which in turn increases the storage capacity of S2. After the storage capacity is increased, data is stored in volumes as the time lapses. At time T3 when the remote copy capacity between S2 and S3 increases, S3 issues an alarm because of an insufficient storage capacity.

In the remote copy configuration, adding to the storage capacity may occur frequently in some cases as described above. The reason for this is that when an insufficient storage capacity occurs at one storage device, another storage device in a remote copy relation is not considered. However, since the replica volume's storage device only receives data written in the original volume's storage device, the replica volume's storage device cannot know the information as to how the data has been used on what object (storage of on-line services and e-mails), or how the data has been used in what environment (for example, a rapidly increasing data environment or a gradually increasing data environment), and the like. Therefore, when attention is paid to an individual storage device, it is difficult to estimate the storage capacity to be used by the storage device.

In order to correctly estimate the storage capacity, it is necessary for a storage manager to perfectly grasp the remote copy configuration in the storage system and to make consideration by reflecting the information of the original volume's storage device upon the replica volume's storage device. This is a large load on a storage manager.

In order to increase the storage capacity, a storage unit such as a hard disk is prepared and installed. However, when an alarm has been issued indicating that the current storage area is almost full, expansion of the storage space may be impractical because of the high cost of hard disk expansion. If an installation work is performed frequently, a large running cost is generated as compared to the case the installation work is performed at a time.

In the situation that storage units of different types (e.g., fibre channel hard disks and Serial ATA (AT Attachment) hard disks) are mixed in one storage device, it is necessary to check how many storage units of which type are to be prepared for each storage device, when the storage capacity is to be increased. This is a large load on the storage manager.

In order to solve at least one of the above-described issues, one aspect of the present invention provides a capacity management method of managing a capacity of a storage unit (such as a disk apparatus) of each storage device in a computer system having a plurality of storage devices each having one or more storage units each providing one or more storage areas, comprising the steps of: detecting a storage area relation between a first storage area and a second storage area; and calculating an estimated capacity necessary for the storage unit in accordance with a detection result.

Other features of the present invention will become apparent from the description of the specification and accompanying drawings.

DESCRIPTION OF THE EMBODIMENTS

Embodiments of the invention will be described with reference to FIGS. 2 to 17. The following description does not limit the present invention.

Description will first be made on the configuration of a computer system and a storage system according to the first embodiment.

Figure 2:
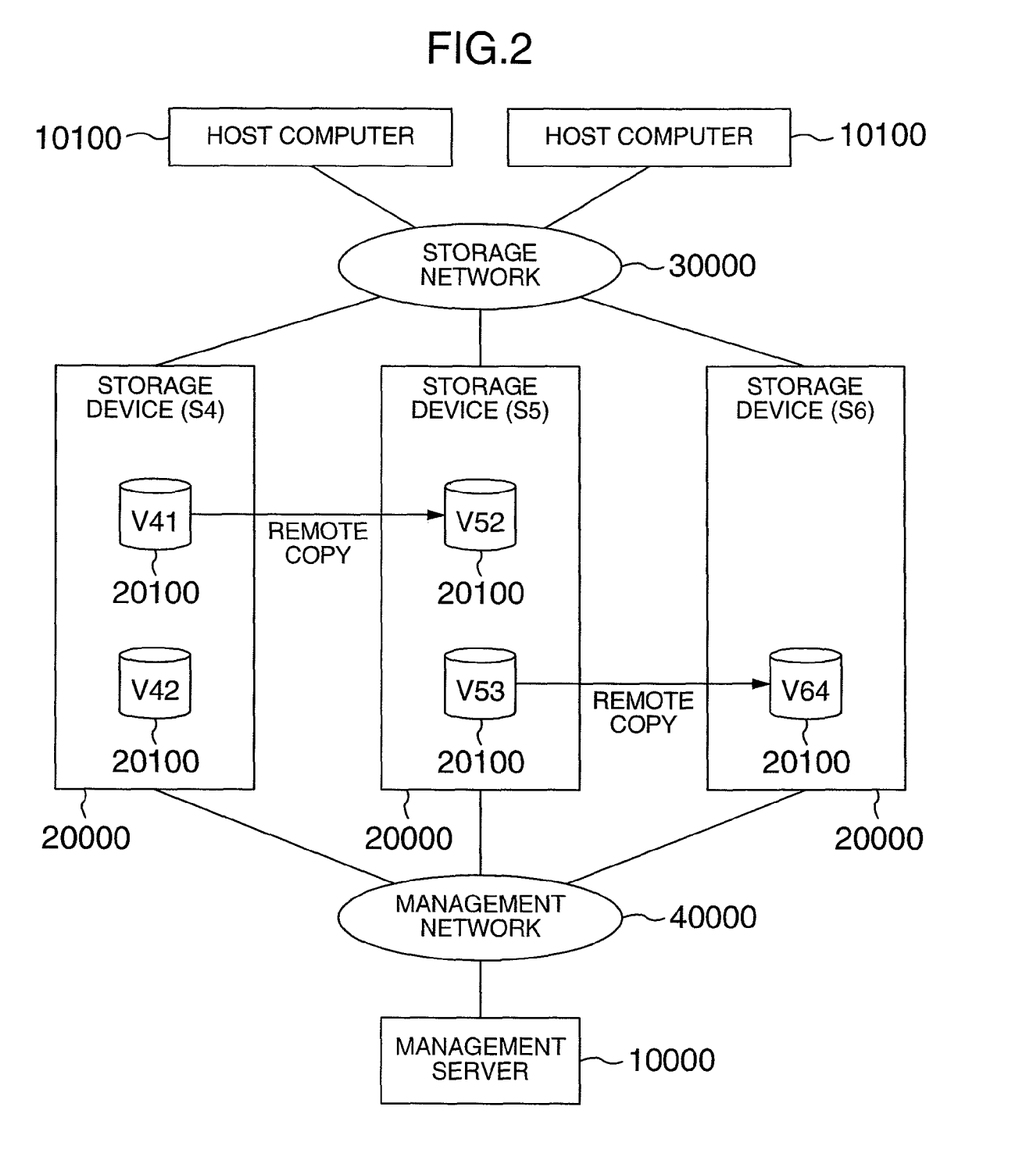
FIG. 2 is a diagram showing the configuration of a management server and storage devices according to a first embodiment.

FIG. 2 shows the configuration of a management server and storage devices. There are a management server 10000, storage devices 20000 and host computers 10100. The storage devices S4, S5 and S6 are interconnected by a storage network 30000 and connected to the management server 10000 by a management network 40000. The host computers 10100 are connected to storage devices via the storage network 30000.

Each storage device 20000 has volumes 20100. The storage device S4 has volumes V41 and V42, the storage device S5 has volumes V52 and V53 and the storage device S6 has a volume V64. V41 is remote-copied to V52 whereas V53 is remote-copied to V64. S4 has an empty storage device capacity of 50 GB, S4 has 400 GB and S6 has 400 GB. The capacity of each volume is 200 GB for V41 and V52, and 100 GB for V53 and V64. No remote copy is executed for V42. The host computer 10100 performs data read/write relative to the storage device 20000 via the storage network 30000. Data read/write is performed relative to the volume (V41, V53) as an original volume or the volume (V42) without any remote copying, among the volumes 20100.

For the purposes of description convenience, although one management server, two host computers, three storage devices and five volumes are used, the numbers of these are not limited. A plurality of storage networks 30000 may be interconnected by themselves, or a plurality of management networks 40000 may be interconnected by themselves. Although the remote copy configuration incorporated herein copies volumes between different storage devices, the internal copy configuration may be incorporated which copies volumes in the same storage device.

Figure 3:
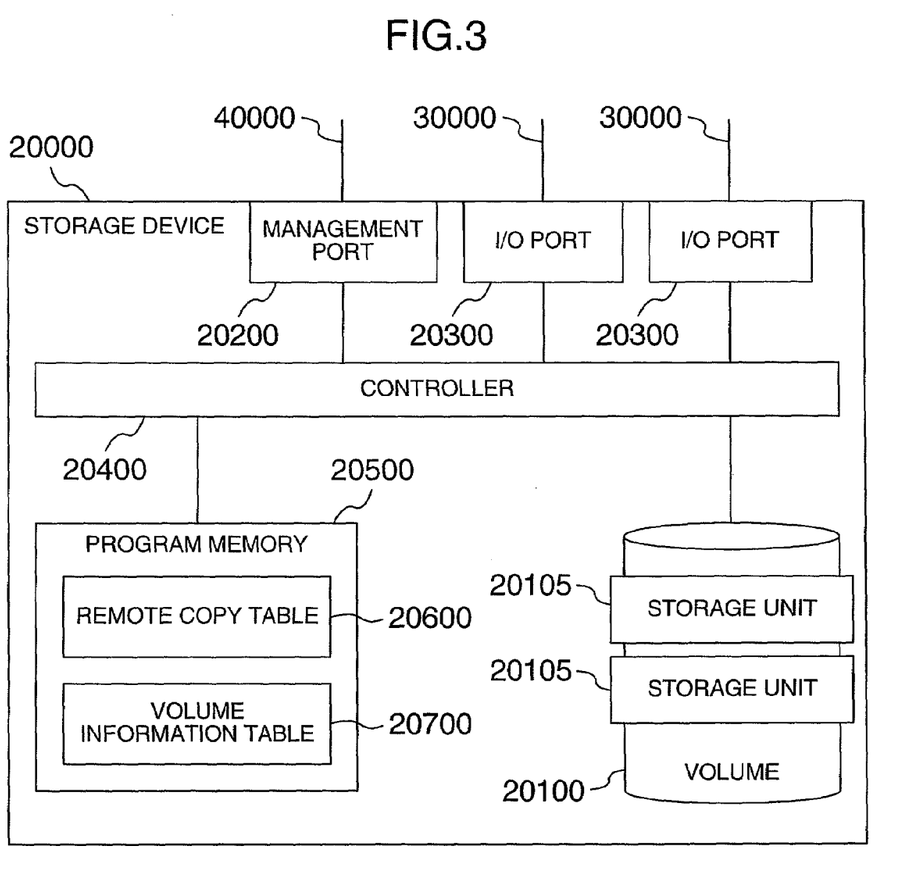
FIG. 3 is a diagram showing the detailed configuration of the management server 10000 of the first embodiment.

FIG. 3 shows the detailed structure of the storage device 20000. The storage device 20000 is constituted of: a management port 20200 for connection to the management network 40000; I/O ports 20300 for connection to the storage network 30000; a controller 20400 for control of the inside of the storage device; a volume 20100 used as the storage area to be provided to the computer system; and a program memory 20500 used by the controller. These elements are interconnected by the controller 20400.

The logical volume (simply called a "volume") 20100 may be constituted of one storage unit 20105 as a disk unit such as a hard disk or may be constituted of a plurality of storage units 20105 to distributively store data.

The program memory 20500 stores a remote copy table 20600 storing information on the remote copy configuration and a volume information table 20700 storing information on the volume 20100 possessed by the storage device. The number of I/O ports, and the numbers and capacities of storage units and volumes are not limited.

Figure 4:
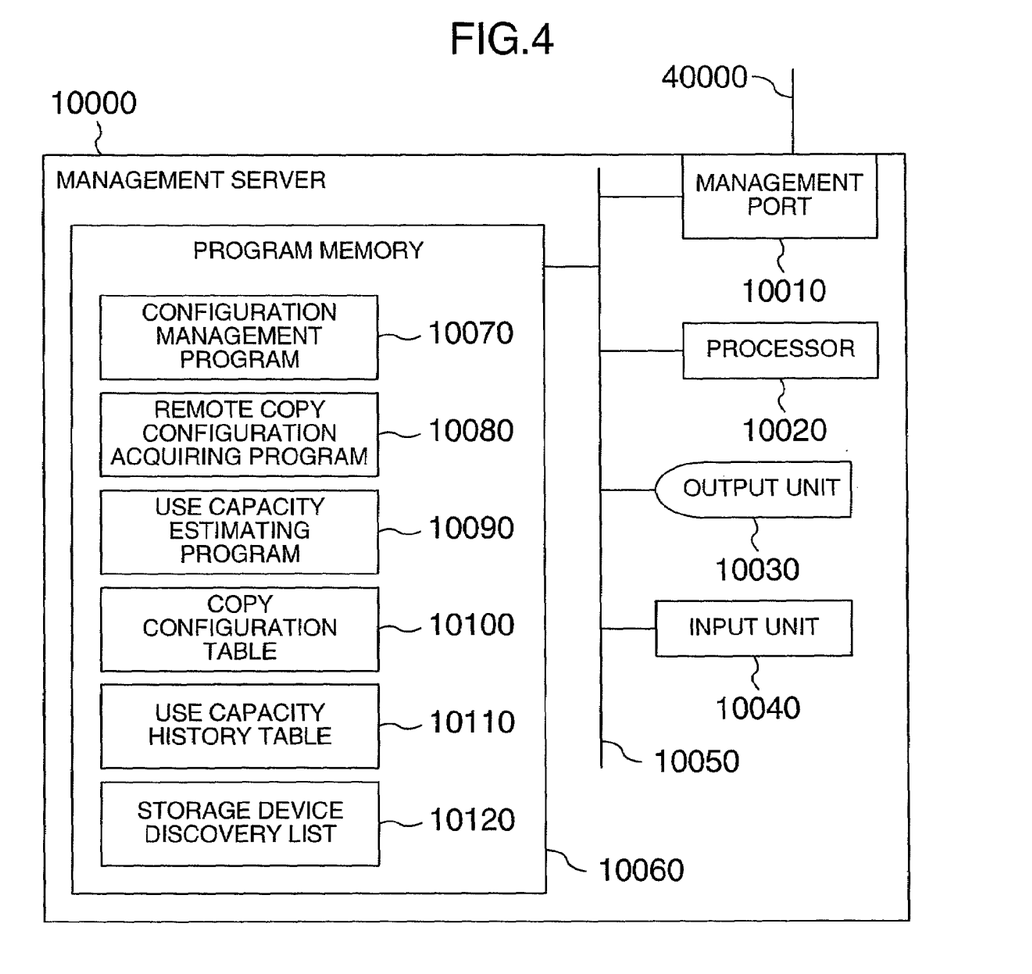
FIG. 4 is a diagram showing the detailed configuration of the storage device 20000 of the first embodiment.

FIG. 4 shows the detailed structure of the management server 10000. The management server 10000 is constituted of: a management port 10010 for connection to the management network 40000; a processor 10020 for processing; an output unit 10030 for outputting the processed results such as a display device; an input unit 10040 for receiving an input from a storage manager, such as a keyboard; and a program memory 10060. These are interconnected by a communication path 10050 such as a bus. The program memory 10060 stores therein: a configuration management program 10070 for the management of storage devices; a remote copy configuration acquiring program 10080 for acquiring the remote copy configuration; a use capacity estimating program 10090 for estimating a use storage capacity by the storage system; a copy configuration table 10100 for storing information acquired by the remote copy configuration acquiring program 10080; a use capacity history table 10110 for storing information used by the use capacity estimating program 10090; and a storage device discovery list 10120 for storing information of connected storage devices.

Figure 5:
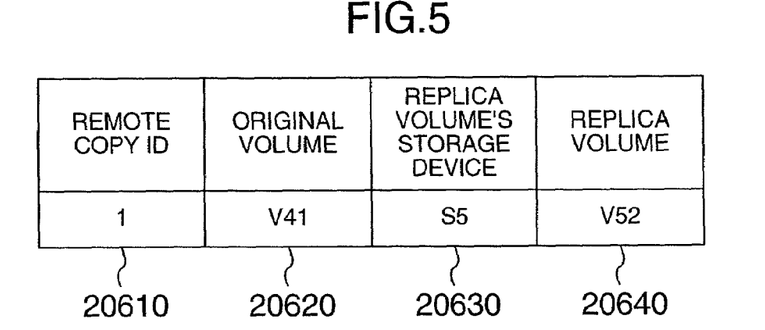
FIG. 5 is a diagram showing an example of a remote copy table 20600 possessed by the storage device 20000 of the first embodiment.

FIG. 5 shows an example of the remote copy table 20600 possessed by the storage device 20000. The remote copy table 20600 is constituted of: a field 20610 for registering an ID for unanimously identifying a remove copy; a field 20620 for registering an original volume; a field 20630 for registering a replica volume's storage device; and a field 20640 for registering a replica volume of the replica volume's storage device.

For the purposes of the following description, FIG. 5 shows specific values in the remote copy table possessed by the storage device S4. It indicates that a remote copy is executed from the volume V41 of S4 to the volume V52 of S5.

Figure 6:
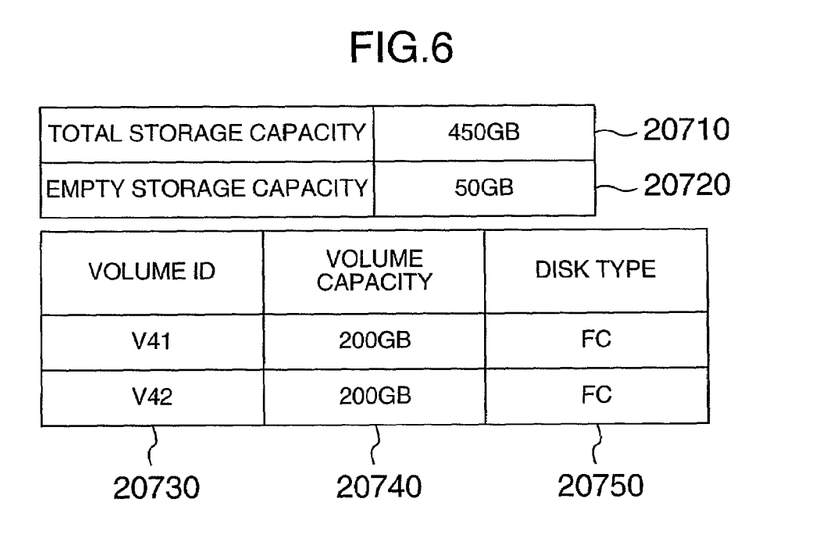
FIG. 6 is a diagram showing an example of a volume information table 20700 possessed by the storage device 20000 of the first embodiment.

FIG. 6 shows an example of the volume information table 20700 possessed by the storage device 20000. The volume information table 20700 is constituted of a field 20710 indicating a total sum of a storage capacity of the storage device; a field 20720 indicating a capacity of an unused storage area; a field 20730 for registering an ID for unanimously identifying a volume; a field 20740 for registering a capacity used by each volume; and a field 20750 for registering the type of disk device used by each volume.

For the purposes of the following description, FIG. 6 shows specific values in the volume information table possessed by the storage device S4. It indicates that the total storage capacity of S4 is 450 GB, the unused storage capacity is 50 GB, the volume V41 of S4 used the capacity of 200 GB, and the volume V42 used the capacity of 200 GB. The disk device used by the volumes V41 and V42 is a fibre channel hard disk.

In the field 20750 for registering the type of disk device shown in FIG. 6, a pair of a vendor name and a type number of the disk device may be registered, or a value representative of the characteristics of the disk device such as "high speed small capacity" and "low speed large capacity" may be registered.

Figure 7:
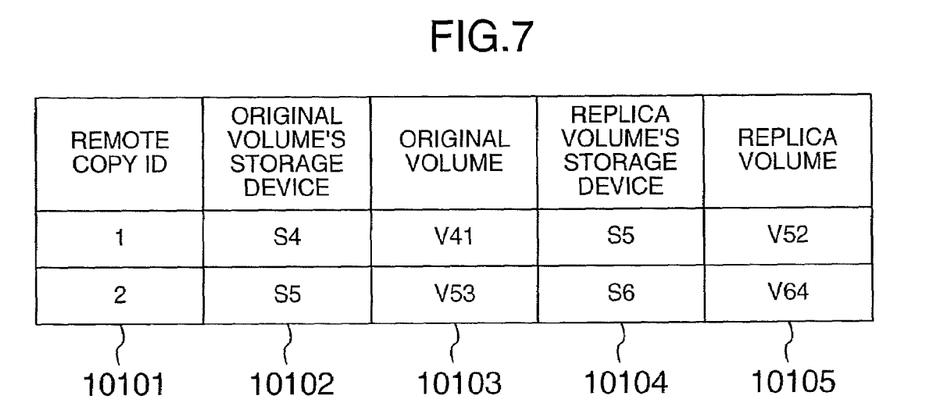
FIG. 7 is a diagram showing an example of a copy configuration table 10100 possessed by the management server 10000 of the first embodiment.

FIG. 7 shows an example of the copy configuration table 10100 possessed by the management server 10000. The copy configuration table 10100 is constituted of: a field 10101 for registering an ID for unanimously identifying a remote copy; a field 10102 for registering an original volume's storage device; a field 10103 for registering an original volume of the original volume's storage device; a field 10104 for registering a replica volume's storage device; and a field 10105 for registering a replica volume of the replica volume's storage device.

For the purposes of the following description, FIG. 7 shows specific values in the copy configuration table possessed by the management server 10000. It indicates that a remote copy is executed from the volume V41 of S4 to the volume V52 of S5, and a remote copy is executed from the volume V53 of S5 to the volume V64 of S6.

Figure 8:
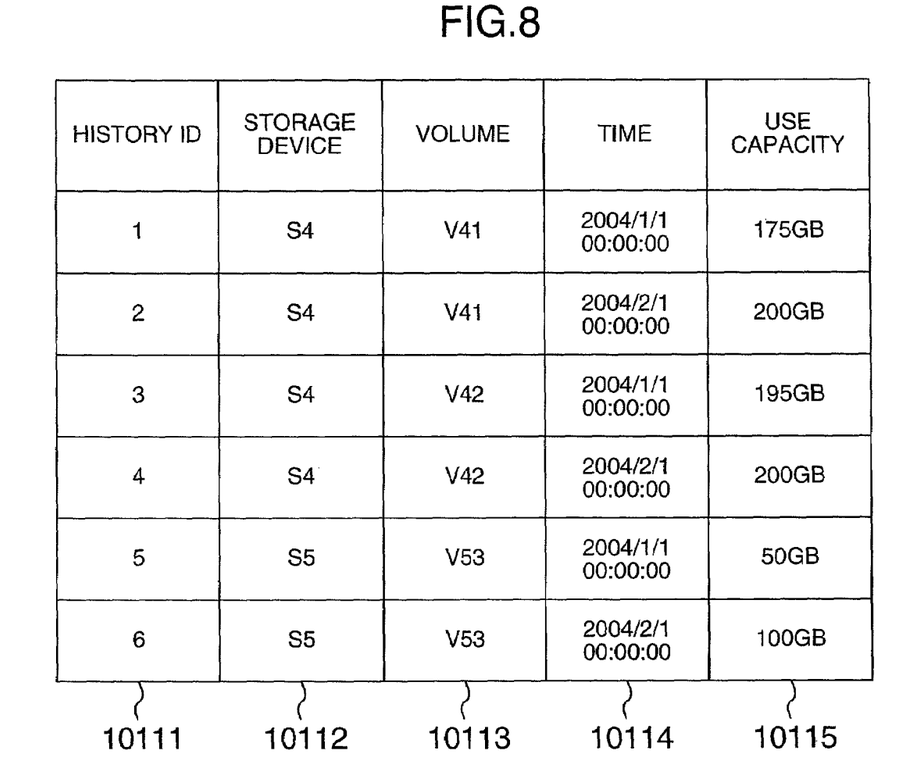
FIG. 8 is a diagram showing an example of a copy configuration table 10110 possessed by the management server 10000 of the first embodiment.

FIG. 8 shows an example of a use capacity history table 10110 possessed by the management server 10000. The use capacity history table 10110 is constituted of: a field 10111 for registering an ID for unanimously identifying history information; a field 10112 for registering the storage device having a volume as a subject of the history information; a field 10113 for registering a volume as a subject of the history information; a field 10114 for registering the time when the history information was acquired; and a field 10115 for registering a use capacity of a volume at the time when the history information was acquired.

For the purposes of the following description, FIG. 8 shows specific values in the use capacity history table possessed by the management server 10000. It indicates that 175 GB of the volume V41 of S4 was used at the time of 2004/1/1 00:00:00 and 200 GB was used at the same time of 2004/2/1, 195 GB of the volume V42 of S4 was used at the time of 2004/1/1 00:00:00 and 200 GB used at the same time of 2004/2/1, and 50 GB of the volume V53 of S5 was used at the time of 2004/1/1 00:00:00 and 100 GB used at the same time of 2004/2/1.

Figure 9:
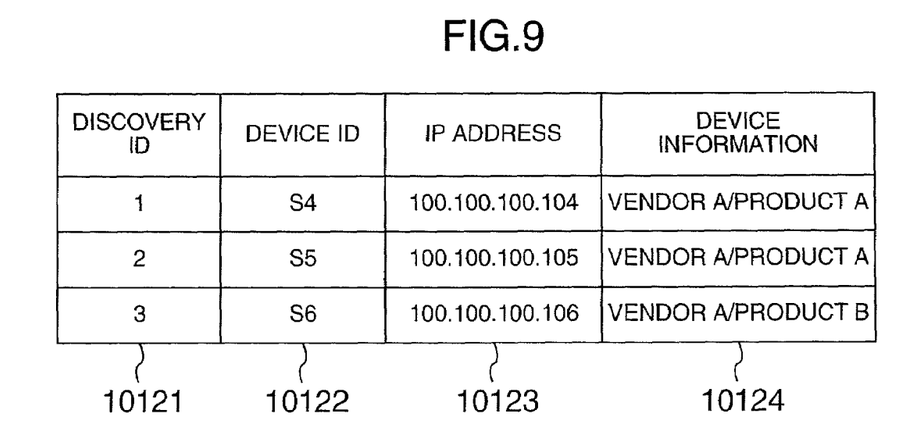
FIG. 9 is a diagram showing an example of a storage device discovery list 10120 possessed by the management server 10000 of the first embodiment.

FIG. 9 shows an example of the storage device discovery list 10120 possessed by the management server 10000. The storage device discovery list 10120 is constituted of: a field 10121 for registering an ID for unanimously identifying information in the storage device discovery list; a field 10122 for registering a device ID representative of the device to be discovered; a field 10123 for registering an identification ID of the management port for connection to the management port of the device to be discovered; and a field 10124 for registering product information such as the vendor name and product type number of the device to be discovered. It is assumed that this list is registered in advance by the storage manager or automatically registered by using discovery services or the like on the management network.

For the purposes of the following description, FIG. 9 shows specific values in the storage device discovery list possessed by the management server 10000. It indicates the information on the storage devices S4, S5 and S6.

Description will next be made regarding the operation of the first embodiment.

The remote copy configuration acquiring program 10080 acquires the information of storage devices under the management of the management server 10000 from the storage device discovery list 10120, and receives the information in the remote copy table 20600 from each storage device, to thereby periodically update the copy configuration table 10100. The configuration management program 10070 acquires the information of storage devices under the management by the management server 10000 from the storage device discovery list 10120, and receives the information in the volume information table 20700 from each storage device, to thereby periodically update the use capacity history table 10110.

Figure 10:
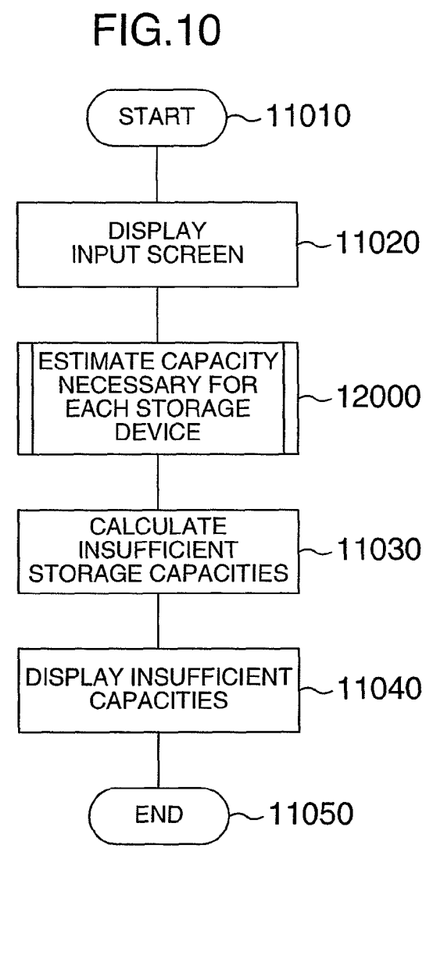
FIG. 10 is a flow chart illustrating a process to be executed by a configuration management program 10070 of the first embodiment.

FIG. 10 is a flow chart illustrating a process of checking the storage device which requires increasing the capacity, when a capacity of the storage device is to be increased. This process is executed when an alarm of an insufficient capacity is issued from the storage device 20000 or when the storage manager provides instructions from the configuration management program 10070 via the input unit. In the first embodiment, it is assumed that an alarm of an insufficient capacity is issued from S4.

Figure 12:
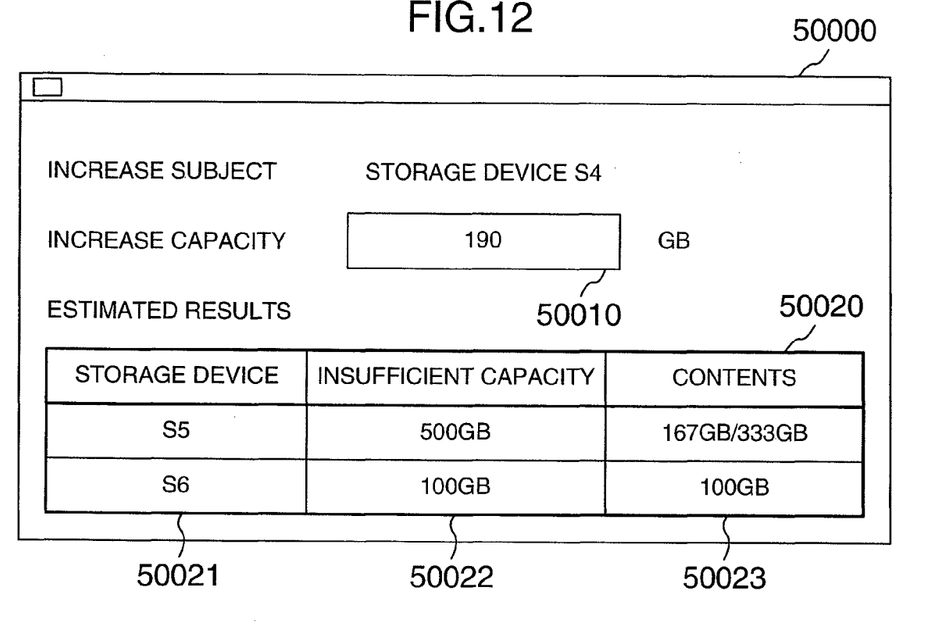
FIG. 12 is a diagram showing an example of an increased capacity input screen 50000 of the first embodiment.

As Step 11020, the configuration management program 10070 displays an increase capacity input screen 50000 on the output unit. FIG. 12 shows an example of the increase capacity input screen. The storage manager inputs an increase amount in a field 50010 of the increase capacity input screen. FIG. 12 shows the value input to the field 50010 and values estimated by a process to be described later and reflected upon a field 50020.

At Step 12000, the storage capacity required by each storage device is estimated, by representing the storage device S4 issued the alarm by SA and the value entered in the field 50010 by C. The details of the process to be executed at Step 12000 will be described later.

At Step 11030, differences between the estimated results obtained at Step 12000 and the capacity used by each storage device are calculated, and the storage capacities required to satisfy particular conditions are calculated. The use capacity at each storage device can be obtained by acquiring the volume information table 20700 for each storage device obtained from the storage device discovery list 10120. The conditions to be used include the conditions that an alarm of an insufficient capacity is not issued, the conditions that an empty capacity has a predetermined ratio relative to the total capacity of all storage devices, and other conditions.

At Step 11040, the results obtained at Step 11030 are reflected in a field 50020 of the increase capacity input screen 50000 to thereafter terminate the process. The values estimated at Step 11030 are reflected upon a field 50022, and the values estimated at Step 12050 in the flow chart shown in FIG. 11 to be described later are reflected upon a field 50023. In accordance with the information in the field 50020, the storage manager increases a storage unit necessary for each storage device, or a new storage device may be added.

Figure 11:
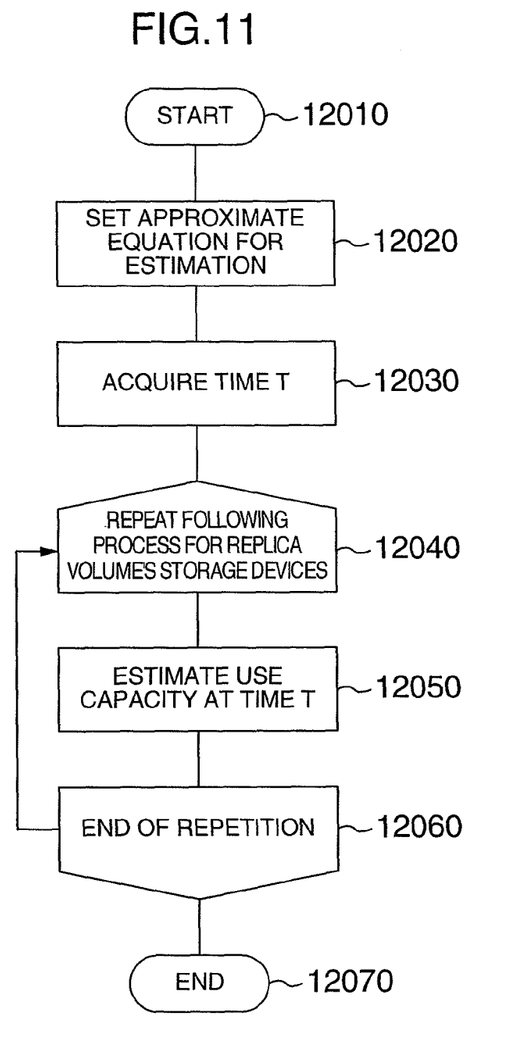
FIG. 11 is a flow chart illustrating a process to be executed by a use capacity estimation program 10090 of the first embodiment.

FIG. 11 is a flow chart illustrating a process to be executed at Step 12000 of the flow chart shown in FIG. 10. As inputs to the program, the storage device SA whose storage capacity is to be increased and the increase storage capacity C are designated.

At Step 12020, an approximate equation for a use capacity of each storage device is set which is used for the following estimation. As a method of setting the approximate equation, there is a method of calculating the approximate equation for the use capacity of each storage device by using the values in the use capacity history table 10110 and the least square method by assuming that the use capacity is a linear function of time. Alternatively, the storage manager may input the approximate equation for the use capacity of each storage unit. In the first embodiment, the approximate equation of U=DM+I is used, where U is the use capacity of each storage device (in the unit of GB), D is the increased use capacity per month of each storage device (in the unit of GB), M is the number of months elapsed since December, 2003, and I is the use capacity of each storage device in December, 2003. If the storage device has a replica volume, the use capacity per month is acquired from the original volume to determine the value D.

At Step 12030, by using the approximate equation set at Step 12020, the storage capacity C is added to the storage device SA and thereafter the time T is estimated which can satisfy the particular conditions. In the first embodiment, the conditions that all the increased storage capacity is used are used as the particular conditions. The other conditions may be the conditions that an insufficient storage capacity occurs which is smaller than a threshold value preset to the storage device SA, the conditions that a storage capacity of a particular ratio of the increased capacity C is used, and other conditions.

Next, at Step 12040, the volumes are discovered which have the remote copy relation to the storage device SA, to extract all storage devices SB which can be traced from the discovered volumes and to execute Step 12050 relative to each storage device of the extracted storage devices. More specifically, all records containing the storage device SA in the original volume's storage device field 10102 of the copy configuration table 10100 are extracted, and the storage devices described in the replica volume's storage device fields 10104 of the records are used as the extracted storage devices SB.

Similarly, all replica volume's storage devices whose original volume's storage device corresponds to the storage device are added to the storage devices SB. This operation is repeated until addition to the storage devices SB will not occur. For example, in FIG. 2, the storage devices SB are S5 and S6 because a remote copy is performed between S4 and S5 and between S5 and S6.

At Step 12050,+ the use capacity at time T of each storage device during the repetition process is estimated from the approximate equation set at Step 12020. If the volume in the storage device is the replica volume of the remote copy and the use capacity cannot be estimated, information necessary for the estimation such as the storage capacity used by the volume and parameters of the approximate equation is acquired from the original volume's storage device. In the first embodiment, the increase volume use capacity per month is acquired. After the information necessary for the estimation is acquired, the use capacity at the time T is estimated from the approximate equation.

Figure 14:
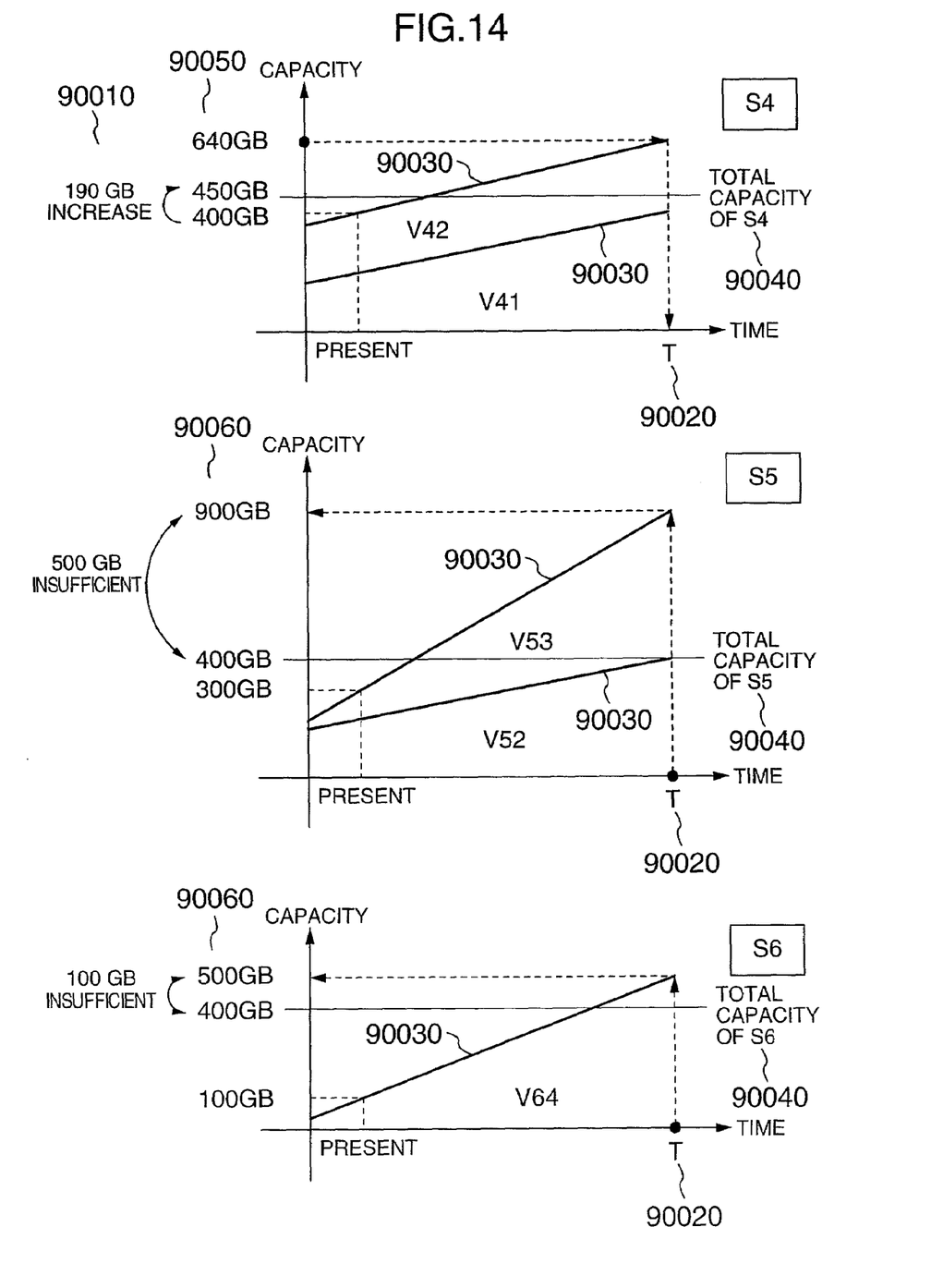
FIG. 14 is a diagram illustrating a process of the first embodiment.

With reference to FIG. 14, a detailed description will now be made regarding the process to be executed in accordance with the flow chart shown in FIG. 10.

First, an estimation equation 90030 for the use capacity is set to each volume of each storage device.

Next, for the storage device S4 whose capacity is to be increased, the increase capacity (190 GB) 90010 input to the field 50010 of the increase capacity input screen 50000 is added to the total capacity (450 GB) 90040 to calculate a virtual total capacity (640 GB) 90050. In the first embodiment, the conditions of calculating the time T are based upon the time taken to use all of the increased capacity and a time T 90020 taken to use the capacity 90050 is calculated from the estimation equation 90030. If the other conditions are used, the capacity from which the time T 90020 is calculated is changed properly.

The calculated time T is applied to the other storage devices S5 and S6 which can be traced from the remote copy relation, and estimated amounts 90060 of the use capacities at the time T are calculated for S5 and S6. In the first embodiment, the estimated amount 90060 of the use capacity of S5 is 900 GB and the estimated amount 90060 of the use capacity of S6 is 500 GB. The slopes of estimation equations of V52 and V53 of S5 are different. This is because V52 is the replica volume of V41 so that the capacity change of V52 follows or synchronizes with the capacity change of V41 and the storage capacities used by V41 and V53 are different.

The differences between the estimated amounts 90060 and the present total capacities 90040 are reflected upon the field 50020 of the increase capacity input screen 50000 as the insufficient amounts of the respective storage devices, and presented to the storage manager. In the first embodiment, since the total capacity 90040 of S5 is 400 GB, the insufficient amount of S5 is 500 GB, whereas since the total capacity 90040 of S6 is 400 GB, the insufficient amount of S6 is 200 GB.

As described above, according to the first embodiment, it is possible for the storage manager to properly increase the storage capacity of the storage device without grasping the remote copy configuration.

In the first embodiment, although the management server 10000 has the management program such as the configuration management program 10070, the storage device 20000 or host computer 10100 may have the whole or a portion of the management program.

The system structure of the second embodiment is the same as that of the first embodiment and the description thereof is omitted.

Next, the operation of the second embodiment will be described. Although the second embodiment performs operations similar to those of the first embodiment, the details of the processes illustrated in FIGS. 10 and 11 are different. These different points will be described.

In the first embodiment, the flow chart of FIG. 10 illustrates the process of checking the storage device required to increase its capacity when the capacity of each storage device is to be increased. In the second embodiment, this flow chart illustrates a process of checking the storage device required to increase its capacity if each storage device is controlled so as not to issue an alarm of an insufficient storage capacity during a specific term or period. This process is executed when the storage manager provides instructions from the configuration management program 10070 via the input unit. In the second embodiment, it is assumed that an instruction is entered by the storage manager.

Figure 13:
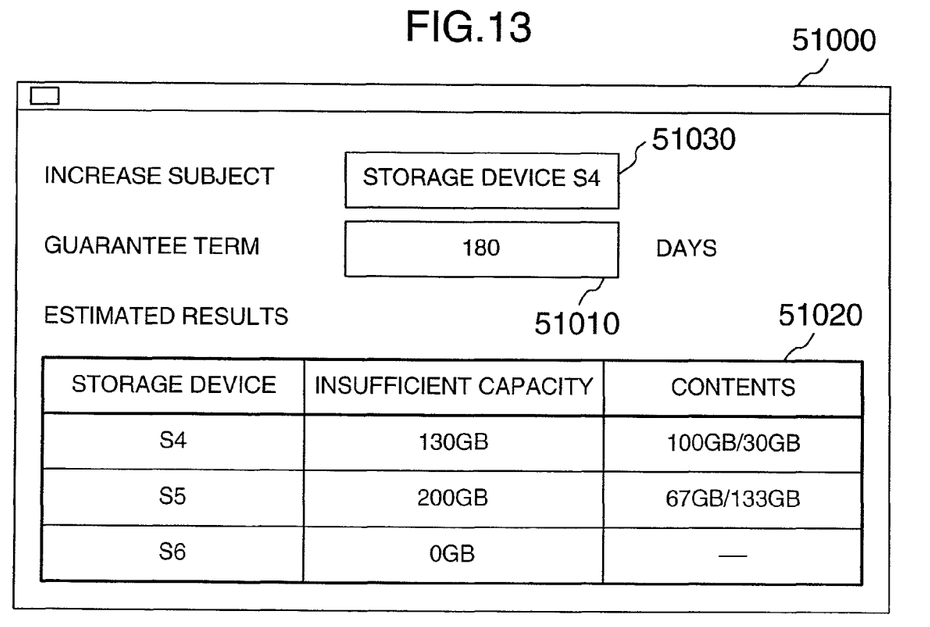
FIG. 13 is a diagram showing an example of a guaranteed period input screen 51000 according to a second embodiment.

At Step 11020, a guarantee term input screen 51000 is displayed on the output unit. FIG. 13 shows an example of the guarantee term input screen 51000. The storage manager inputs the storage device which is controller so as not to issue the insufficient capacity alarm to a field 51030 of the guarantee term input screen 51000, and inputs the term while the insufficient capacity alarm is not allowed to be issued to a field 51010. In designating the storage device in the field 51030, the storage device may be selected from a list of storage devices under management by the management server 10000. Not only a single storage device but also a plurality of storage devices may be selected. At Step 12000 a storage capacity necessary for each storage device is estimated, by representing the storage device input to the field 51030 by SA and the term input to the field 51010 by D. The details of the process at Step 12000 will be given later. The following Steps are similar to those of the first embodiment and the description thereof is omitted.

FIG. 11 is the flow chart illustrating the process to be executed at Step 12000 in the flow chart shown in FIG. 10. The storage device SA as the subject device and the term D are designated as an input to the program. The different points between the first and second embodiments reside in Step 12030 and Step 12040. These Steps will be described and the description of the other Steps is omitted.

At Step 12030 the input term D is added to the present time to calculate the time T.

At Step 12040, extractions are made for the storage device designated in the field 51030 of the guarantee term input screen 51000 and all storage devices SB capable of being traced by the remote copy relation from the designated storage device, to thereby allow Step 12050 to be executed for each storage device of SB. Specifically, similar to Step 12040 of the first embodiment, the storage devices SB are extracted and the designated storage device SA is added to the storage devices SB. For example, in FIG. 2, the storage devices SB are S4, S5 and S6 because a remote copy is executed between S4 and S5 and between S5 and S6.

Since Step 12050 and following Steps are similar to those of the first embodiment, the description thereof is omitted.

As described above, according to the second embodiment, the storage manager can properly increase the storage capacity so as not to allow a particular storage to issue the insufficient storage capacity alarm during a particular term, without grasping the remote copy configuration.

Next, the system structure of the third embodiment will be described. Although the system structure of the third embodiment is similar to that of the first embodiment, the details of the structure of the management server 10000 shown in FIG. 4 are different, and only these different points will be described.

Figure 15:
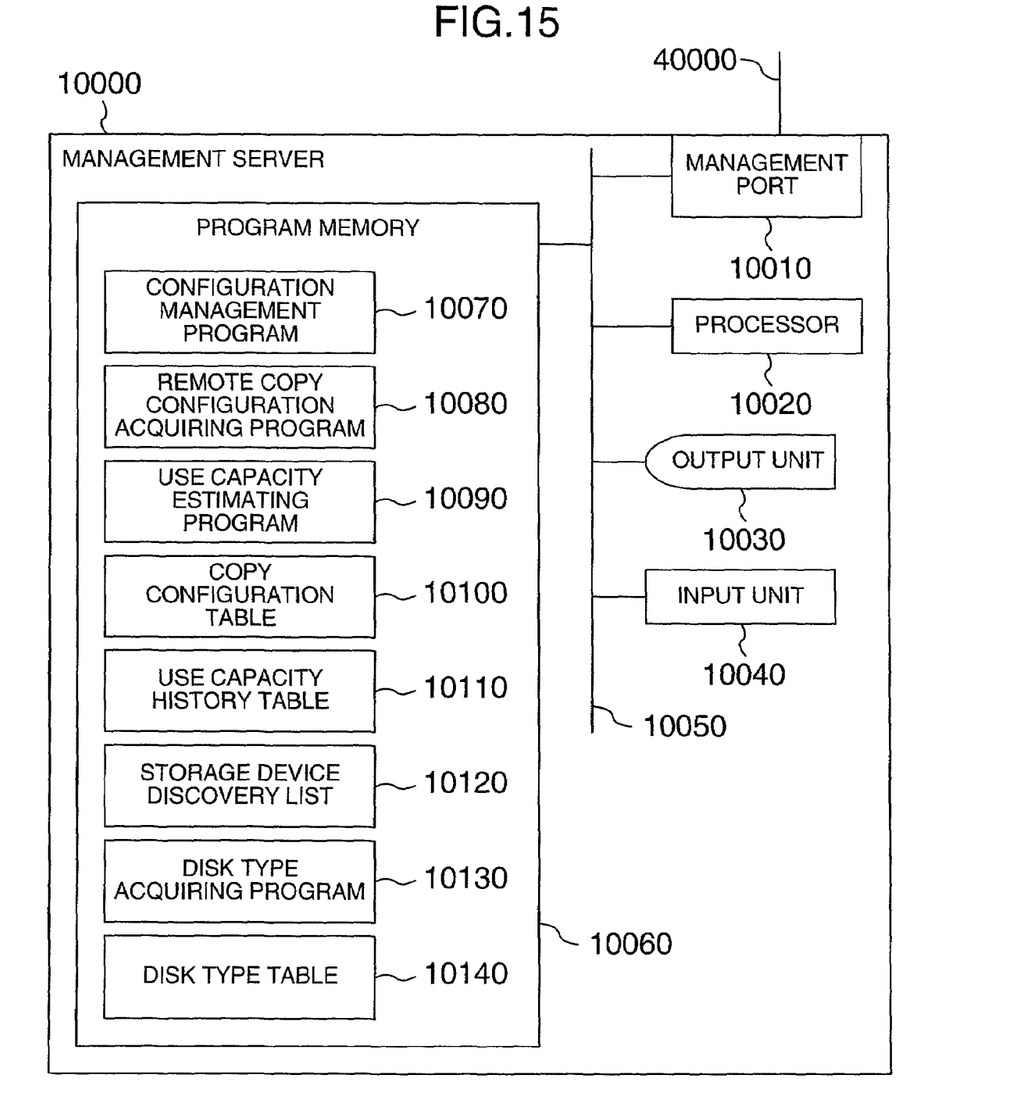
FIG. 15 is a diagram showing the detailed configuration of a management server 10000 according to a third embodiment.

FIG. 15 shows the detailed structure of a management server 10000. The structure shown in FIG. 15 has a disk type acquiring program 10130 for acquiring the type of a physical disk and a disk type table 10140 for storing information acquired by the disk type acquiring program 10130, respectively added to the structure shown in FIG. 4.

Figure 16:
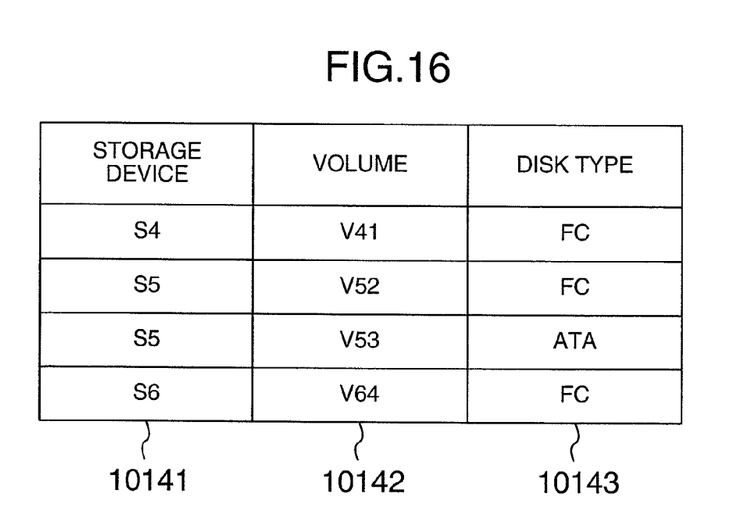
FIG. 16 is a diagram showing an example of a disk type table 10140 possessed by the management server 10000 of the third embodiment.

FIG. 16 shows an example of the disk type table 10140 possessed by the management server 10000. The disk type table 10140 is constituted of: a field 10141 for registering each storage device having a volume; a field 10142 for registering a volume of the storage device; and a field 10143 for registering the type of a physical disk device constituting the volume.

For the purposes of following description, FIG. 16 shows specific values in the disk type table possessed by the management server 10000. It indicates that the volume V41 of S4, volume V52 of S5 and volume V64 of S6 are fiber channel hard disks and the volume V53 of S5 is a Serial ATA hard disk.

If, instead of the type of a disk device, a pair of the vendor name and type of a disk device or a value representative of the characteristics of a disk device are registered, these values are copied to the field 10143 shown in FIG. 16.

The operation of the third embodiment will now be described. Although the third embodiment performs a process similar to the first embodiment, an execution of the disk type acquiring program 10130 and the increase capacity input screen 50000 shown in FIG. 12 are different, and only these different points will be described.

The disk type acquiring program 10130 acquires information of each storage device under the management by the management server 10000 from the storage device discover list 10120, and receives information of the volume information table 20700 from each storage device, to periodically update the disk type table 10140.

Figure 17:
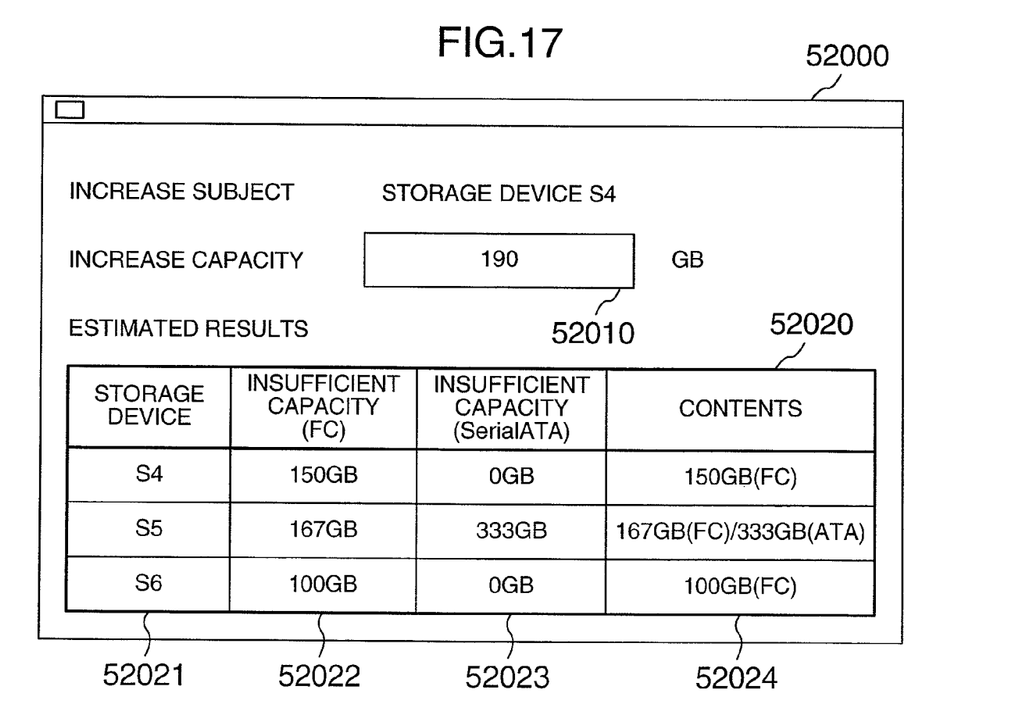
FIG. 17 is a diagram showing an example of an increase capacity input screen 52000 of the third embodiment.

At Step 11020 in the flow chart shown in FIG. 10, the increase capacity input screen 52000 is displayed on the output unit. FIG. 17 shows an example of the increase capacity input screen 52000. The storage manager inputs the increase capacity to a field 52010. FIG. 17 shows that the value input to the field 52010 and the estimated insufficient capacities are reflected upon a field 52020.

At Step 11040 the results obtained at Step 11030 are reflected upon the field 52020 of the increase capacity input screen 52000. In the field 52020, the insufficient storage capacities are displayed for each disk type. The values to be reflected upon the field 52020 can be obtained by referring to the disk type table 10140 and adding the capacities of each volume obtained at Step 11030 for each disk type. In FIG. 17, the capacities of the fiber channel hard disks are shown in a field 52022 and the capacities of Serial ATA hard disks are shown in a field 52023.

In FIG. 16, if, instead of the type of a disk device, but a pair of a vendor name and a type number of a disk device is registered in the field 10143 for registering the type of a disk device, the insufficient storage capacity for each type of a disk device can be displayed. If a value representative of the characteristic of a disk device is registered in the field 10143, the insufficient storage capacity for the characteristics of each disk device can be displayed.

As described above, according to the third embodiment, the storage manager can properly increase a storage capacity of each storage device without grasping the type of each disk mounted on the storage device and the remote copy configuration.

The system structure of the fourth embodiment is the same as that of the first embodiment, and the description thereof is omitted.

The operation of the fourth embodiment will now be described. The operations of the remote copy configuration acquiring program 10080 and configuration management program 10070 are similar to those of the first embodiment.

Figure 18:
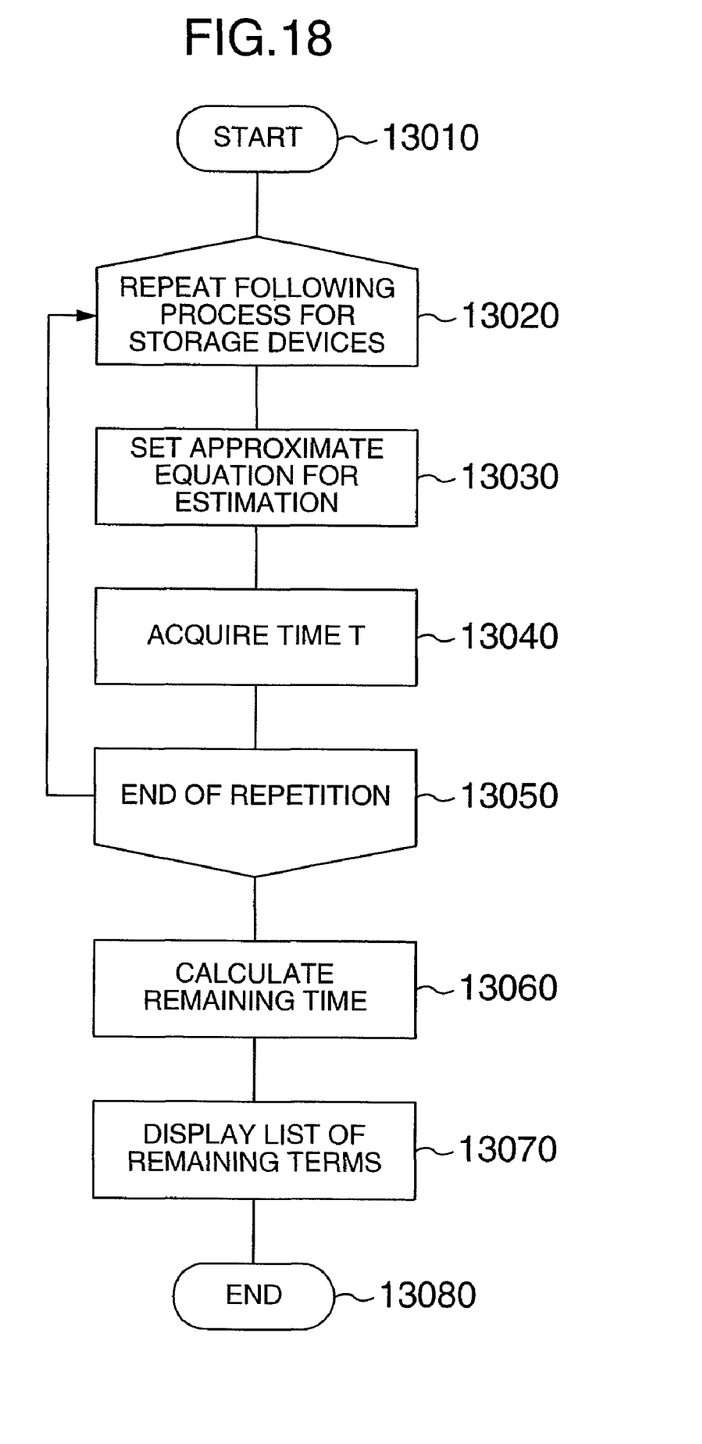
FIG. 18 is a flow chart illustrating a process to be executed by a configuration management program 10070 according to a fourth embodiment.
Figure 19:
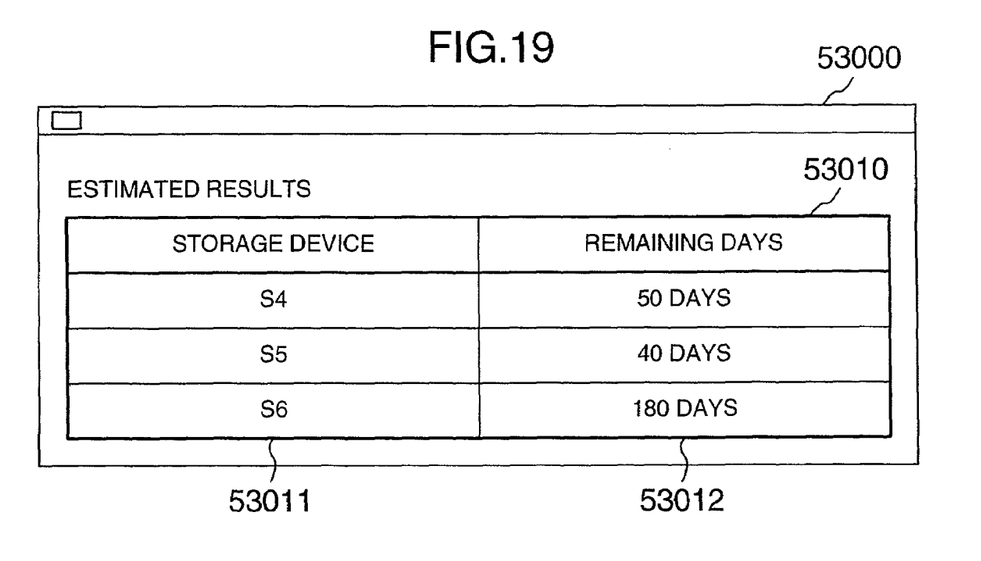
FIG. 19 is a diagram showing an example of a remaining term display screen 53000 of the fourth embodiment.

FIG. 18 is a flow chart illustrating a process of checking the term until a storage device satisfies particular conditions. This process is executed when the storage manager explicitly provides instructions from the configuration management program 10070, when it becomes the time preset by the configuration management program 10070, or when this process is activated by a program executed by another management server 10000 interconnected via the management network 40000. In the fourth embodiment, it is assumed that the storage manager instructs.

At Step 13020 it is prepared to allow Step 13030 and Step 13040 to be executed for each storage device 20000. In the fourth embodiment, the process is executed for the storage device designated by the configuration management program 10070. The storage manager may select the subject storage device.

At Step 13030, similar to Step 12020 shown in FIG. 11, the approximate equation used by the storage device is set.

At Step 13040, similar to Step 12030 shown in FIG. 11, the estimated time T to satisfy particular conditions is calculated. The fourth embodiment uses the conditions that all the present capacity of the storage device is used.

At Step 13060 the time to the time T from the present time is calculated for each storage device for which the loop from Step 13020 to Step 13050 was executed. The calculated time is the remaining time until the storage device satisfies the particular conditions.

At Step 13070 a remaining time display screen 53000 is displayed on the output unit. FIG. 18 shows an example of the remaining time display screen 53000. A field 53011 indicates each storage device executed the loop from Step 13020 to Step 13050, and a field 53012 indicates a remaining term of each storage device acquired at Step 13060.

As described above, the storage manager can know the term until the storage capacity of each storage device becomes insufficient without grasping the remote copy configuration.

According to the embodiments described above, the storage manager can estimate the storage capacity used by the storage system without grasping the remote copy configuration and, correspondingly, a load on the storage manager can be reduced. It is also possible to prevent the insufficient storage capacity of each of a plurality of storage devices in the remote copy relation from occurring frequently, so that the cost of the management of storage devices can be suppressed. By estimating the necessary storage capacity beforehand, the capacity management can be performed systematically. It is possible to know the contents of the insufficient storage capacities in the storage system for each type of disk constituting the volume, so that the capacity management work can be performed efficiently. The programs described in the embodiments may be realized by hardware in each device to realize the processes of each program.

According to one aspect of the present invention, the storage manager can estimate the storage capacity of the storage system without grasping the remote copy configuration and a load on the storage manager can be reduced.

It should be further understood by those skilled in the art that although the foregoing description has been made on embodiments of the invention, the invention is not limited thereto and various changes and modifications may be made without departing from the spirit of the invention and the scope of the appended claims.

What we claim is:

1. A management computer comprising:
    an interface connected via a first network to a plurality of storage devices each having at least one disk apparatus which each have a plurality of storage units; and
    a processor,
    wherein, in accordance with a judgment that there is a plurality of storage units relation between a first plurality of storage units of a first storage device of said plurality of storage devices and a second plurality of storage units of a second storage device of said plurality of storage devices connected via a second network to said first storage device, said processor calculates an estimated capacity for the at least one disk apparatus comprising the first storage device based on a used capacity of the at least one disk apparatus comprising the second storage device,
    wherein, the relation is a remote copy or replication relation between the first plurality of storage units and the second plurality of storage units in which a replica of data stored in the second plurality of storage units are stored in the first plurality of storage units in response to a request from a computer so that the estimated capacity of the first plurality of storage units is adjusted based on the used capacity of the second plurality of storage units—that will be copied or replicated to the first plurality of storage units, and
    further comprising a third plurality of storage units in the first storage device, which third plurality of storage units does not have a plurality of storage units-relation of a remote copy or replication with the second plurality of storage units, and wherein a slope of an estimation equation for calculating estimated capacity of said third plurality of storage units differs from a slope of an estimation equation for calculating the estimated capacity of said first plurality of storage units—on the used capacity of said second plurality of storage units.

2. The management computer according to claim 1, wherein said processor acquires the plurality of storage units relation between a first plurality of storage units of said first storage device and a second plurality of storage units of said second storage device from one of said first and second storage devices, wherein said processor estimates a used capacity of the second plurality of storage units during a predetermined term and estimates the used capacity of the first plurality of storage units in accordance with said plurality of storage units relation and the estimated used capacity of the second plurality of storage units, and wherein the first plurality of storage units and the second plurality of storage units are in different disk apparatuses of different storage devices.

3. The management computer according to claim 1, further comprising:
    an input unit for inputting an instruction of a process to be executed by said processor; and
    an output unit for outputting a process executed by said processor,
    wherein said processor receives an input of an addition of the at least one disk apparatus to one of said storage devices from said input unit, and in accordance with a capacity of said added disk apparatus and said plurality of storage units relation between different disk apparatuses, calculates a capacity of the disk apparatus to be added to another storage device and outputs a calculation result to said output unit.

4. The management computer according to claim 1, further comprising:
    an input unit for inputting an instruction of a process to be executed by said processor; and
    an output unit for outputting a process executed by said processor,
    wherein said processor receives an input of a predetermined term, and estimating said used capacity estimates a used capacity after a lapse of said input predetermined term.

5. The management computer according to claim 1, wherein said processor estimates the used capacity of the second plurality of storage units of said second storage device, and if the used capacity exceeds a capacity of the at least one disk apparatus provided by the second plurality of storage units after a lapse of a predetermined term, detects whether a capacity of another disk apparatus is required to be added.

6. The management computer according to claim 5, wherein said processor detects in accordance with said plurality of storage units relation between the second plurality of storage units of said second storage device and the plurality of storage units of another storage device.

7. The management computer according to claim 6, wherein said plurality of storage units relation is a relation that data stored in one plurality of storage units is also stored in another plurality of storage units.

* * * * *